June 26, 1934.  M. P. GRAHAM  1,964,258

METHOD OF FORMING SOLID ENDS ON METAL TUBING

Filed July 15, 1932

Inventor
Matthew P. Graham.
by Charles O. Wills
Attys.

Patented June 26, 1934

1,964,258

UNITED STATES PATENT OFFICE 1,964,258

METHOD OF FORMING SOLID ENDS ON METAL TUBING

Matthew P. Graham, Detroit, Mich., assignor to Thompson Products Incorporated, Detroit, Mich., a corporation of Ohio Application July 15, 1932, Serial No. 622,656

6 Claims. (Cl. 29—153.1)

The present invention relates to the method of forming solid ends on tubular metal articles and particularly to the making of tubular axles for automotive vehicles.

It is the principal purpose of this invention to provide a simple, economical, and expedient method of forming solid ends on metal tubing. To this end, the process is carried out by cutting a metal tube to the desired length, swaging a free end to reduce the diameter at this portion, forcing a comparatively short solid metal plug into the reduced portion and subsequently upsetting the end.

The process is particularly adapted for the formation of tubular vehicle axles having solid end portions.

It is therefore an object of this invention to provide a speedy and economical method of making tubular axles with reinforced ends.

It is a further object of this invention to provide a method of making tubular axles by reinforcing the ends of a metal tube and upsetting these ends to form reinforced king pin receiving portions.

It is a particular object of this invention to provide a method of making a tubular vehicle axle wherein the ends of a tube are reduced, metal plugs inserted therein and the reinforced ends upset and drilled to receive the king pins of the wheels of the vehicle.

It is also an object of this invention to provide an improved vehicle axle.

These and other objects of this invention will be apparent from the following description and appended claims.

This invention (in a preferred form) is illustrated in the accompanying drawing and hereinafter more fully described.

Figure 1:
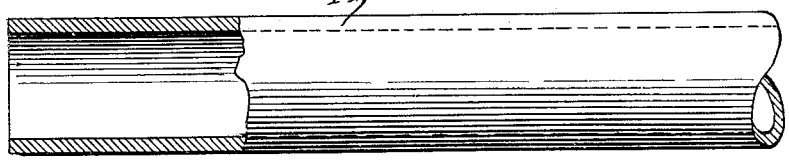
Figure 1 is a fragmentary elevational view, partly in section, of a metal tube used in carrying out the process of this invention.
Figure 2:
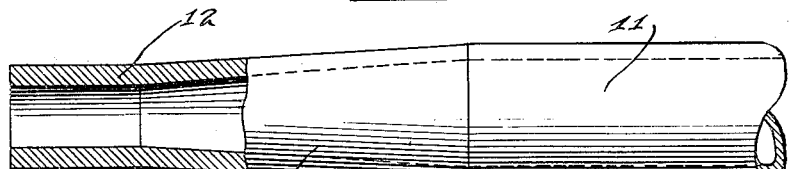
Figure 2 is a view similar to Figure 1 of a tube after its end has been swaged, reamed, and faced.
Figure 3:
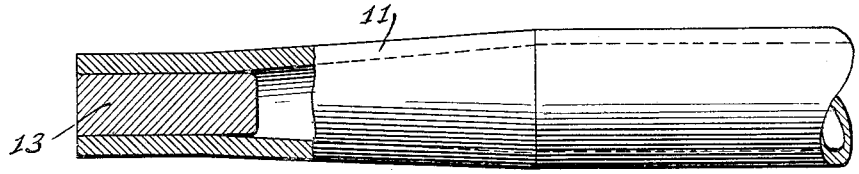
Figure 3 illustrates the tube of Figure 2 with a plug inserted therein.

The reference numeral 11 indicates a light, seamless, metal tube which is cut to the desired length from longer tubular stock. The metal tube 11 has its ends swaged to reduce the diameter of the tube at these portions, as indicated at 12.

The figures of the drawing illustrate the process as being carried out on one end of the metal tube, but it will be understood that like steps are performed on the opposite end of the tube.

The swaging of the tube may be performed after the tube has been heated to forging temperature or this step may be carried on while the tube is cold. In carrying out the swaging process the ends of the walls of the tube may be thickened or drawn out and maintained at the same thickness as the rest of the tube.

Figure 4:
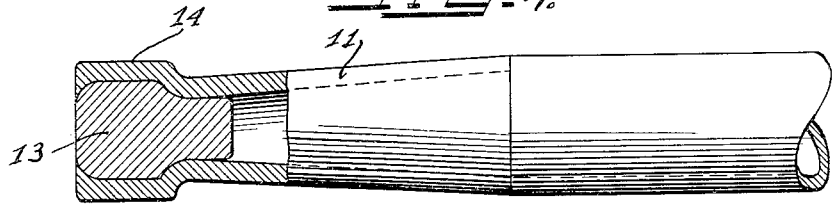
Figure 4 illustrates a subsequent operation on the tube.

The swaged portion 12 of the tube has its inner face reamed and subsequently a metal plug 13 is pressed in the swaged and reamed end. The end of the rod is then heated to forging temperature and upset as shown at 14 in Figure 4.

Figure 5:
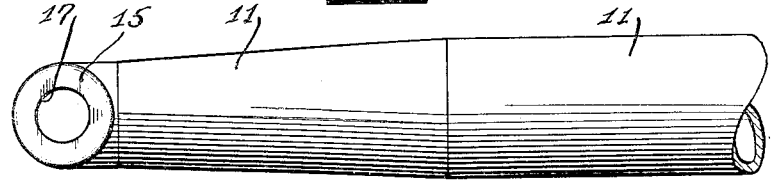
Figure 5 is a fragmentary plan view of a tube formed into a vehicle axle.
Figure 6:
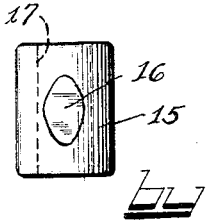
Figure 6 is an end elevational view of the axle of Figure 5.

The upsetting operation serves to firmly secure the inner metal 13 to the tube metal 11. In this operation, a set of dies is used so as to form the upset portion 14 into the cylinder 15 as best shown in Figure 5. The jaws of the die grip the tube metal and prevent the flow of the metal of the plug. The metal of the tube does not fully cover the inner metal and a small portion of it projects as shown at 16 in Figure 6 but this portion is finished off even with the outer metal and does not in any way interfere with the subsequent use of the finished tube.

When the tube is to be used for an axle, such as the front axle of an automobile, the cylindrical portion 15 has a cylindrical aperture 17 bored therethrough. This aperture 17 receives the king pin of the automobile wheel. No bushing or sleeve is necessary in the aperture 17, but may be used if desired.

While any suitable tube steel may be used for the tube and any suitable steel used for the plug, it has been found preferable, in practice, to use for the tube a steel having 0.35% carbon or higher while the plug is preferably a low carbon steel one having 0.20% carbon or less. It has been found that the low carbon plug is more fluid at forging temperature than the high carbon tube and consequently readily adapts itself to the shape of the end of the tube formed in the upsetting process.

As an alternative method of making the tube, the plug may be pressed into the end of the tube and the end of the tube heated to forging temperature and subsequently swaged to reduce the size of the tube and the plug and then the upsetting operation performed as before. When the article is formed by this latter method, it has been found advantageous to place the plug a short distance within the tube and then to peen over the edges of the tube so as to firmly secure the plug previous to the swaging and upsetting operations.

It will also be understood, that the article can be formed by placing the plug in the tube and subsequently upsetting as before but without the intermediate step of swaging.

A tube formed with solid forged ends as described, finds ready application in the automotive industry, particularly for use as front axles of the vehicles. The tubular structure gives the necessary rigidity and lightness for such a part. The particular construction of the end portions serves as suitable bearing members for attaching the wheels.

The method has proved an economical and practical means of forming forged solid ends on tubular rods and particularly a satisfactory way of forming tubular axles for automobiles. The invention may readily be used in forming tie rods and drag links as the solid ends may be drilled to form sockets for receiving bearing portions of stud members.

I am aware that numerous details of the method may be varied through a wide range without departing from the principles of this invention, and I, therefore, do not purpose limiting the patent granted hereon otherwise than necessitated by the prior art.

I claim as my invention:

1. The process of forming a solid forged end on metal tubing which comprises swaging an end of a tube to reduce its diameter, reaming that end, pressing a solid metal plug therein and upsetting the composite end thus formed.

2. The process of forming a solid forged end on metal tubing, which comprises swaging an end of a metal tube to reduce its diameter, reaming and facing that end, pressing a solid metal plug of softer metal therein, heating said end to forging temperature and upsetting the composite end thus formed.

3. The method of making vehicle axles which comprises swaging the ends of a metal tube to reduce its diameter at its ends, pressing solid metal plugs of softer metal than the tube therein, heating the ends to forging temperature, and upsetting the ends thereon.

4. The method of making vehicle axles which comprises swaging the ends of a high carbon steel tube to reduce the cross sectional diameters thereof, inserting solid plugs of low carbon steel therein and drilling openings for king pins through the composite tube and plugs adjacent the ends of the tube.

5. The method of making vehicle axles which comprises swaging the ends of a metal tube of high carbon steel to reduce the cross sectional diameters thereof, pressing solid metal plugs of low carbon steel therein, and upsetting the composite ends thus formed.

6. The process of forming a solid forged end with a relatively soft core on metal tubing which comprises swaging an end of a tube to reduce its diameter at that end, inserting a solid metal plug of softer material than the tube in the reduced end and upsetting the composite end thus formed.

MATTHEW P. GRAHAM.